United States Patent [19]

Hooper et al.

[11] Patent Number: 4,547,440
[45] Date of Patent: Oct. 15, 1985

[54] ELECTROCHEMICAL CELL

[75] Inventors: Alan Hooper, Hinton Waldrist; John M. North, Newbury, both of England

[73] Assignee: United Kingdom Atomic Energy Authority, London, England

[21] Appl. No.: 601,594

[22] Filed: Apr. 18, 1984

[30] Foreign Application Priority Data

Apr. 22, 1983 [GB] United Kingdom ................ 8310992
Oct. 19, 1983 [GB] United Kingdom ................ 8328021

[51] Int. Cl.[4] ............................................ H01M 6/36
[52] U.S. Cl. .................................. 429/112; 429/192; 429/50
[58] Field of Search .................. 429/112, 191, 192, 50; 29/623.1

[56] References Cited

U.S. PATENT DOCUMENTS

| | | | |
|---|---|---|---|
| 3,704,174 | 11/1972 | Berger | 429/192 |
| 4,060,673 | 11/1977 | Dey | 429/192 |
| 4,143,213 | 3/1979 | Jacobson et al. | 429/112 |
| 4,143,214 | 3/1979 | Chang et al. | 429/112 |
| 4,303,748 | 12/1981 | Armand et al. | 429/192 |
| 4,365,009 | 12/1982 | Grimes et al. | 429/192 X |
| 4,436,796 | 3/1984 | Huggins et al. | 429/112 |

Primary Examiner—Charles F. LeFevour
Attorney, Agent, or Firm—Larson and Taylor

[57] ABSTRACT

A solid state electrochemical cell comprises an anode having lithium as its active material, a polymeric electrolyte, and a cathode comprising a composite of an insertion electrode material or similarly active material and a polymeric material.

One of the electrolyte and the cathode possesses an ionically conducting phase at ambient temperature and the other of the electrolyte and the cathode lacks such a phase. Ionic conductivity can be induced in said other of the electrolyte and cathode at elevated temperature thereby to render the cell operable and give rise to improvements in comparison with cells where such phases are present ab initio.

4 Claims, 3 Drawing Figures

ELECTROCHEMICAL CELL

This invention relates to a solid state electrochemical cell comprising an anode having lithium as its active material, a polymeric electrolyte, and a cathode comprising a composite of an insertion electrode material or similarly active material, and a polymeric material.

A solid state electrochemical cell comprising a Li or Li-based anode, a lithium ion conducting polymeric electrolyte, and a cathode based on an insertion electrode material such as $V_6O_{13}$, $V_2O_5$ or $TiS_2$ is known. See, for example, South African Patent Application No. 79/6263. In order to achieve high active cathode utilizations at realistic current densities, the cathode may be constructed as a composite structure comprising the insertion electrode material (active catholyte), the polymer electrolyte and, if required, an electronically conducting medium such as graphite. Examples of preferred proportions are: 20% to 70% polymer electrolyte, 30% to 80% active catholyte and, if required, 1% to 20% of an electronically conducting medium, where all percentages are by volume.

The invention is concerned with an electrochemical cell of the above kind but in which one of the electrolyte and the cathode lacks an ionically conducting phase at ambient temperature.

The invention provides a solid state electrochemical cell comprising an anode having lithium as its active material, and a polymeric electrolyte, and a cathode comprising a composite of an insertion electrode material or similarly active material, and a polymeric material, characterised in that one of the electrolyte and the cathode possesses an ionically conducting phase at ambient temperature and the other of the electrolyte and the cathode lacks an ionically conducting phase at ambient temperature and that ionic conductivity can be induced in said other of the electrolyte and the cathode at elevated temperature thereby to render the cell operable.

The cell of the invention cannot operate at ambient temperature as one of the electrolyte and the cathode does not contain an ionically conducting phase at such temperature. However, on heating, for example to a temperature in the range of 80° C. to 140° C., said one of the electrolyte and the cathode becomes ionically conducting, presumably by diffusion of ionically conducting material thereto from the other of the electrolyte and the cathode.

Where the electrolyte possesses an ionically conducting phase and the cathode lacks such a phase at ambient temperature, the following advantage is obtained. Thus, it is desirable that, in the cell, the particle size of the insertion electrode material is as small as possible consistent with producing a microstructure in which all the phases present are both continuous and homogeneous. Hitherto, a way of preparing the cathode has been to cast a film from a dispersion of the insertion electrode material in a solution of polymeric material and a lithium salt (to constitute the ionically conducting phase) in a solvent, followed by removal of the solvent. However, the particle size of the insertion electrode material in the film produced is found to be much greater than its particle size prior to dispersion. However, in the present invention, the cathode can be made in the *absence* of a lithium salt when it has been found that there is no such undesirable increase in the particle size of the insertion electrode material; there is hence an improvement in cell performance.

Where the cathode possesses an ionically conducting phase and the electrolyte lacks such a phase at ambient temperature, the cell of the invention rendered operable at elevated temperature has been found to possess improved performance over the above-mentioned known cell in terms of useful current density. This is possibly due to an electrolyte made conducting by the above mechanism having an advantageous structure in terms of the ratio of amorphous to crystalline polymer content therein in comparison with an electrolyte that is ionically conducting ab initio. Other advantages are that the electrolyte is easy to handle during fabrication of the cell and fewer chemical process steps are required to fabricate the electrolyte itself. Also, the electrolyte is less sensitive to water vapour in the atmosphere.

The composite cathode may contain, as an insertion electrode material, a material known in the art such as exemplified above and a macromolecular material such as poly (ethylene oxide), referred to hereinafter as PEO, or poly (propylene oxide), referred to hereinafter as PPO. Where the cathode possesses an ionically conducting phase, the macromolecular material may be complexed with a lithium salt, the anoin of which may, for example, be $I^-$, $Br^-$, $ClO_4^-$, $SCN^-$ or $F_3CSO_3^-$, to constitute that phase. If required, the composite cathode may also contain an electronically conducting medium such as graphite or other forms of carbon. In operation of a cell of the invention where the cathode possesses an ionically conducting phase and the electrolyte lacks such a phase at ambiemt temperature, the overall lithium salt concentration of the cathode is reduced because lithium salt passes to the electrolyte at elevated temperatures.

The cathode may be in the form of a film and may be made in this form by casting. It may be cast directly onto a current collector, for example in the form of a metal foil. The solvent used may, for example be an equivolume mixture of methanol and trichlorethylene, or acetonitrile. The electrolyte may also be in the form of a film and may also be made by casting in a similar way. The anode may be in the form of a metal foil.

The electrolyte may be a macromolecular material such as exemplified above in respect of the cathode. Where the electrolyte possesses an ionically conducting phase, the macromolecular material may be complexed with a lithium salt such as exemplified above to constitute that phase. In operation of a cell of the invention where the electrolyte possesses an ionically conducting phase and the cathode lacks such a phase at ambient temperature, the overall lithium salt concentration of the electrolyte is reduced because lithium salt passes to the cathode at elevated temperature. This need not significantly affect the ionic conductivity of the electrolyte which may be roughly constant over a wide compositional range. For example, $(PEO)_xLiF_3CSO_3$ has a roughly constant ionic conductivity for values of x from 9 to 20.

A cell of the invention may be made in the form of a sandwich arrangement of the anode, electrolyte and composite cathode, for example by stacking, rolling or folding into the required configuration and containment within a suitable cell casing. The high ionic resistance at ambient temperatures of such a cell gives rise to a low self discharge rate during storage and hence to a long shelf life. When the cell is required to produce an electric current, it is heated to its operating temperature.

In a further aspect, the invention provides a method of making an operable solid state electrochemical cell comprising assembling in the form of a cell an anode having lithium as its active material, a polymeric electrolyte, and a cathode comprising a composite of an insertion electrode material in combination with a polymeric material, characterised in that one of the electrolyte and the cathode possesses an ionically conducting phase at ambient temperature and the other of the electrolyte and the cathode lacks an ionically conducting phase at ambient temperature, and that the cell is heated to an elevated temperature thereby to induce ionic conductivity in said other of the electrolyte and the cathode.

Several ways of carrying out the invention will now be described, by way of example only, as follows. Also included is a comparative example (Example A) which is not an example of the invention. Reference will be made in the examples to the accompanying drawings wherein.

EXAMPLE 1

A composite cathode was prepared by dispersing $V_6O_{13}$ and acetylene black in a solution of PEO in acetonitrile and applying the dispersion to a nickel foil current collector and removing the solvent. The composition of the dispersion was such that the composition of the composite cathode by volume was: 50% PEO, 45% $V_6O_{13}$ and 5% acetylene black; the thickness of the composite cathode was ~50 μm.

An electrolyte was prepared as a film by casting a solution of PEO and $LiF_3CSO_3$ in acetonitrile and subsequent removal of the solvent. The composition of the electrolyte was $(PEO)_9LiF_3CSO_3$ and its thickness was ~50 μm.

Figure 1:
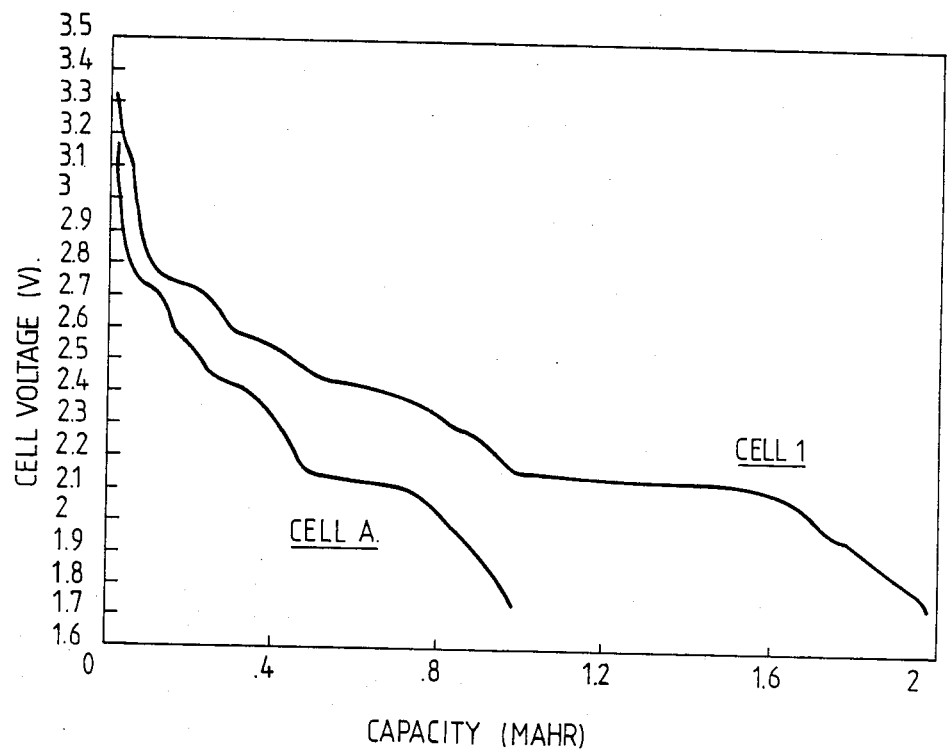
FIG. 1 is a graph showing the relationship between cell voltage and capacity for two cells, one of the invention and one not of the invention.

The above prepared composite cathode and electrolyte together with a Li metal foil anode of thickness ~300 μm were assembled into an electrochemical cell of area 0.75 cm² which was then tested under the following conditions:
  operating temperature: 140° C.
  discharge current: 0.2 mA) constant current
  charge current: 0.1 mA) cycling mode
  voltage limits: 1.7 volts to 3.0 volts The capacity of the cell in relation to voltage is shown in FIG. 1 in the curve marked "Cell 1".

The cathode utilization at discharge number 1 was ~100% and that at discharge number 10 was ~70%.

COMPARATIVE EXAMPLE A

By way of comparison, the procedure of Example 1 was repeated with the exception that the solution from which the composite cathode was prepared additionally contained $LiF_3CSO_3$ dissolved therein.

The capacity of the cell in relation to voltage is shown in FIG. 1 in the curve marked "Cell A".

The cathode utilization at discharge number 1 was ~50% and that at discharge number 10 was ~35%.

EXAMPLE 2

The procedure of Example 1 was repeated with the exception that the cell was tested at a discharge current of 0.6 mA and a charge current of 0.3 mA.

Figure 2:
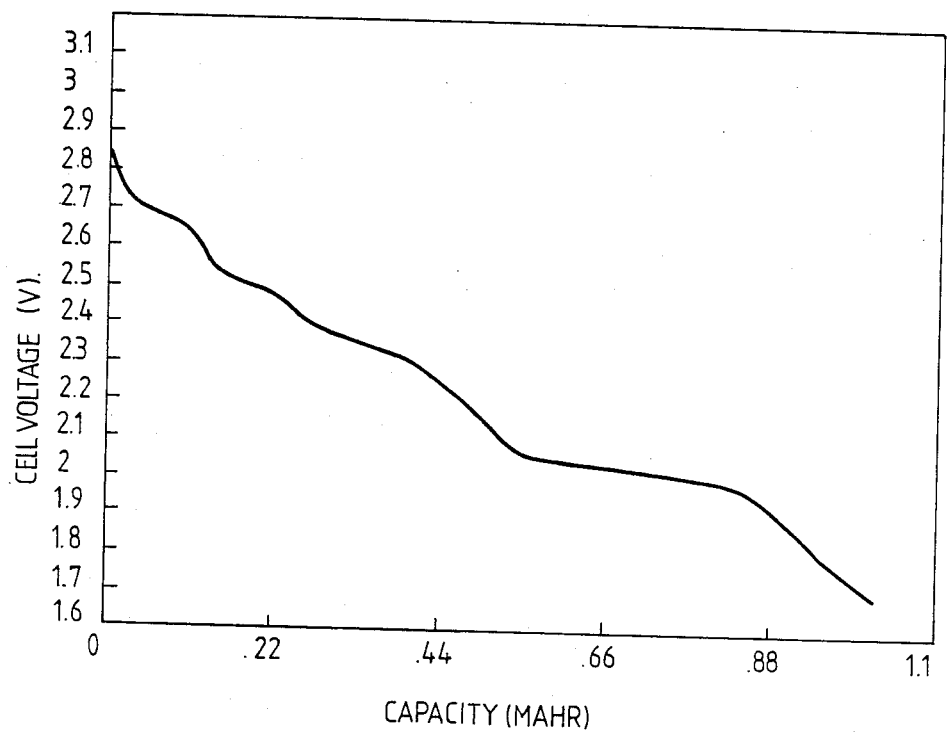
FIGS. 2 and 3 are graphs showing the relationship between cell voltage and capacity for different cells of the invention.

The capacity of the cell in relation to voltage is shown in FIG. 2.

The cathode utilization at discharge number 1 was ~50% and that at discharge number 10 ~25%, i.e. similar to those for the cell of comparative Example A but at a current density three times as great.

EXAMPLE 3

A composite cathode film was prepared by dispersing $V_6O_{13}$ and acetylene black in a solution of PEO and $LiF_3CSO_3$ in acetonitrile and applying the dispersion to a nickel foil current collector by doctor blade casting and removing the solvent. The composition of the dispersion was such that the composition of the composite cathode by volume was: 50% $(PEO)_9LiF_3CSO_3$, 45% $V_6O_{13}$ and 5% acetylene black. The thickness of the composite cathode film was ~50 μm.

An electrolyte was prepared as a film by doctor blade casting a solution of PEO in acetonitrile and subsequently removing the solvent. Two such films having a combined thickness of ~76 m were used to constitute the electrolyte to be assembled into a cell below.

Figure 3:
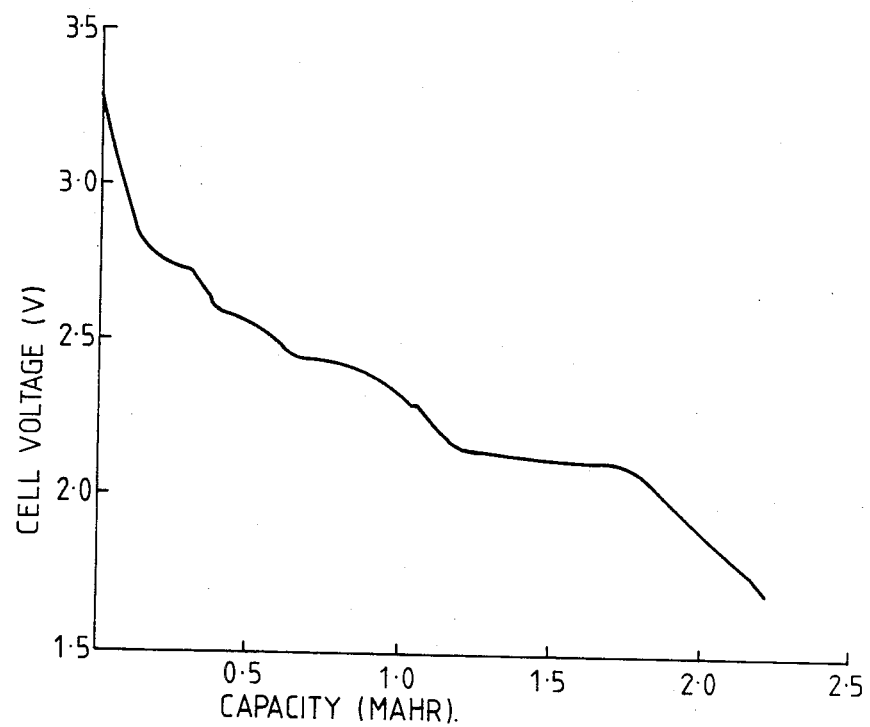

The above prepared composite cathode and electrolyte together with a Li metal foil anode of thickness ~300 μm were assembled into an electrochemical cell of area 0.75 cm² which was then tested under the following conditions:
  operating temperature: 135° C.
  discharge current: 0.2 mA) constant current
  charge current: 0.1 mA) cycling mode
  voltage limits: 1.7 volts to 3.25 volts The capacity of the cell in relation to voltage for the first discharge is shown in FIG. 3 of the accompanying drawings.

The cathode utilization at various discharge numbers was as follows:
  No. 1—100%
  No. 5—76%
  No. 10—65%
  No. 15—61%

We claim:
1. A solid state electrochemical cell comprising an anode having lithium as its active material, an electrolyte comprising a polymeric material capable of forming a complex with a lithium salt, and a cathode comprising a composite of an insertion electrode material and said polymeric material, where, in one of the electrolyte and the cathode, a lithium salt is present as a complex with said polymeric material to constitute an ionically conducting phase and, in the other of the electrolyte and the cathode, such an ionically conducting phase is absent, and wherein ionic conductivity can be induced in said other of the electrolyte and the cathode at elevated temperature thereby to render the cell operable.

2. A method of making an operable solid state electrochemical cell comprising
  (i) assembling in the form of a cell an anode having lithium as its active material, an electrolyte comprising a polymeric material capable of forming a complex with a lithium salt, and a cathode comprising a composite of an insertion electrode material in combination with said polymeric material, wherein, in one of the electrolyte and the cathode, a lithium salt is present as a complex with said polymeric material to constitute an ionically conducting phase and, in the other of the electrolyte and the cathode, such an ionically conducting phase is absent, and (ii) heating the cell to an elevated temperature thereby to induce ionic conductivity in said other of the electrolyte and the cathode.

3. A method as claimed in claim 2 wherein the elevated temperature is within the range of 80° C. to 140° C.

4. A method as claimed in claim 3 wherein the cathode is prepared by coating a film from a dispersion of the insertion electrode material in a solution of the polymeric material in a solvent therefor, followed by removing the solvent, a lithium salt being absent from said solution and a lithium salt being present as a complex with the polymeric material in the electrolyte.

* * * * *